United States Patent
Kokubo

(10) Patent No.: US 10,513,036 B2
(45) Date of Patent: Dec. 24, 2019

(54) CALIBRATION SYSTEM AND CALIBRATION METHOD

(71) Applicant: FANUC CORPORATION, Yamanashi (JP)

(72) Inventor: Kyouhei Kokubo, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 7 days.

(21) Appl. No.: 16/050,373

(22) Filed: Jul. 31, 2018

(65) Prior Publication Data

US 2019/0039246 A1 Feb. 7, 2019

(30) Foreign Application Priority Data

Aug. 3, 2017 (JP) .................................. 2017-150609

(51) Int. Cl.
| | | |
|---|---|---|
| *G06F 19/00* | (2018.01) | |
| *B25J 9/16* | (2006.01) | |
| *B25J 13/08* | (2006.01) | |

(52) U.S. Cl.
CPC ........... *B25J 9/1692* (2013.01); *B25J 9/1697* (2013.01); *B25J 13/08* (2013.01)

(58) Field of Classification Search
CPC combination set(s) only.
See application file for complete search history.

(56) References Cited

U.S. PATENT DOCUMENTS

| 2011/0295421 A1 | 12/2011 | Ban et al. |
| 2015/0273692 A1 | 10/2015 | Ogawara |
| 2016/0039094 A1 | 2/2016 | Lundberg |

FOREIGN PATENT DOCUMENTS

| JP | H05038688 | 2/1993 |
| JP | 2011251365 | 12/2011 |
| JP | 2012223871 A | 11/2012 |
| JP | 2015199192 A | 11/2015 |

OTHER PUBLICATIONS

Japanese Office Action dated Apr. 23, 2019, for Japanese Patent Application No. 2017150609.

*Primary Examiner* — Bhavesh V Amin
(74) *Attorney, Agent, or Firm* — Karceski IP Law, PLLC

(57) ABSTRACT

A calibration system includes a mark for a robot including a first member and second members to that are connected to each other so as to allow relative movement via a joint shaft driven by a motor and also including a rotation-angle sensor that outputs a signal corresponding to a rotation angle of the motor, the mark being fixed to one of the second members; a camera that is disposed outside the robot and that acquires images of the mark; and a difference detection unit that detects the difference between signals output from the rotation-angle sensor at the timings of acquisition of the individual images acquired by the camera when the positions of the mark in the images are caused to substantially match each other before and after reinstallation or replacement of a part.

7 Claims, 6 Drawing Sheets

US 10,513,036 B2

CALIBRATION SYSTEM AND CALIBRATION METHOD

CROSS-REFERENCE TO RELATED APPLICATIONS

This application is based on and claims priority to Japanese Patent Application No. 2017-150609, filed on Aug. 3, 2017, the entire contents of which are incorporated herein by reference.

FIELD OF THE INVENTION

The present invention relates to calibration systems and calibration methods.

BACKGROUND OF THE INVENTION

For a joint shaft of a robot, which is rotated by being driven by a motor, the correspondence relationship between the angle of the joint shaft and a sensor signal that is output from a sensor in accordance with the driving amount of the motor is defined. When the motor on the joint shaft, a reduction gear connected to the motor, or the like is reinstalled or replaced, there are cases where the defined correspondence relationship changes. There are known technologies for performing calibration so as to match the correspondence relationship after the change with the correspondence relationship before the change and then using the correspondence relationship defined before the change instead of newly defining the correspondence relationship after the change in such cases (e.g., see Japanese Unexamined Patent Application, Publication No. 2011-251365).

With the technology disclosed in Japanese Unexamined Patent Application, Publication No. 2011-251365, images of two marks individually provided on two members whose amount of relative movement via a joint shaft changes are captured by a camera before and after reinstallation of a motor or the like, and the correspondence relationship after the reinstallation is calibrated by using the positional relationship between the marks in the two acquired images.

SUMMARY OF THE INVENTION

The present invention provides the following solutions.

The present invention, in one aspect thereof, provides a calibration system including: a mark for a robot including a first member and a second member that are connected to each other so as to allow relative movement via a joint shaft driven by a motor and also including a rotation-angle sensor that outputs a signal corresponding to a rotation angle of the motor, the mark being fixed to the second member; a camera that is disposed outside the robot and that acquires images of the mark; and a difference detection unit that detects the difference between signals output from the rotation-angle sensor at individual timings of acquisition of images in which the positions of the mark are caused to substantially match each other, the images being acquired by the camera before and after reinstallation or replacement of a part that affects a correspondence relationship between the amount of relative movement of the second member in relation to the first member and the signal output from the rotation-angle sensor.

The present invention, in another aspect thereof, provides a calibration method including: a step of fixing a mark for a robot including a first member and a second member that are connected to each other so as to allow relative movement via a joint shaft driven by a motor and also including a rotation-angle sensor that outputs a signal corresponding to a rotation angle of the motor, the mark being fixed to the second member; a step of acquiring images of the mark by using a camera disposed outside the robot; and a step of detecting the difference between signals output from the rotation-angle sensor at individual timings of acquisition of images in which the positions of the mark are caused to substantially match each other, the images being acquired before and after reinstallation or replacement of a part that affects a correspondence relationship between the amount of relative movement of the second member in relation to the first member and the signal output from the rotation-angle sensor.

DESCRIPTION OF EMBODIMENT(S) OF THE INVENTION

A calibration system 100 and a calibration method according to an embodiment of the present invention will be described below with reference to the drawings.

Figure 1:
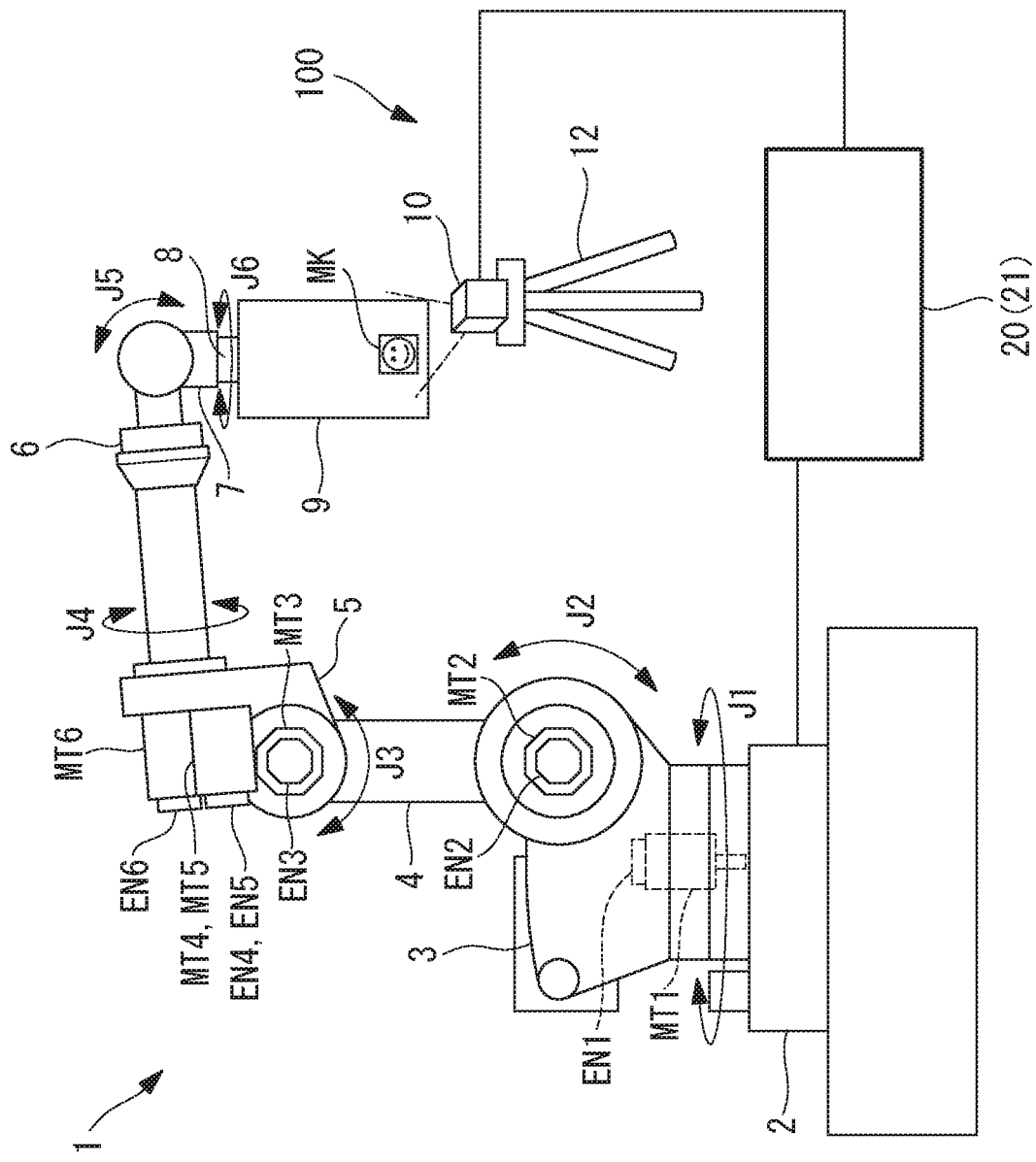
FIG. 1 is a schematic illustration of a robot and a calibration system that executes calibration for the robot.

FIG. 1 is a schematic illustration of a robot 1 and the calibration system 100 that executes calibration for the robot 1. The robot 1 shown in FIG. 1 includes six joint shafts J1 to J6. The individual joint shafts J1 to J6 are provided with corresponding motors MT1 to MT6. The angles of the joint shafts J1 to J6 are controlled by controlling the rotation angles of the motors MT1 to MT6, whereby the position of the distal end and the posture of the robot 1 are controlled.

Specifically, the robot 1 includes a fixed base 2, a rotary body 3 that is supported so as to allow rotational movement relative to the base 2 via the joint shaft J1, a first arm 4 that is supported so as to allow rotational movement relative to the rotary body 3 via the joint shaft J2, a second arm 5 that is supported so as to allow rotational movement relative to the first arm 4 via the joint shaft J3, a first wrist element 6 that is supported so as to allow rotational movement relative to the second arm 5 via the joint shaft J4, a second wrist element 7 that is supported so as to allow rotational movement relative to the first wrist element 6 via the joint shaft J5, and a third wrist element 8 that is supported so as to allow rotational movement relative to the second wrist element 7 via the joint shaft J6. Furthermore, as shown in FIG. 1, the robot 1 includes encoders (rotation-angle sensors) EN1 to EN6 that output signals representing the rotation angles of the motors MT1 to MT6 individually corresponding to the joint shafts J1 to J6. Furthermore, a tool 9 is fixed at the distal end of the third wrist element 8.

This embodiment will be described in the context of an example where the motor MT2 or a reduction gear (not shown) of the joint shaft J2, which rotationally drives the first arm 4 relative to the rotary body 3, is replaced. Thus, in the following description, the rotary body 3 is considered as a first member, and members from the first arm 4 to the tool 9 are considered as second members.

The calibration system 100 according to this embodiment includes a mark MK that is attached to the tool 9 fixed at the distal end of the third wrist element 8, a camera 10 that is fixed to a tripod 12 installed on a floor in the vicinity of the robot 1, and a control device 20 that controls the camera 10 and the individual motors MT1 to MT6 of the joint shafts J1 to J6 in the robot 1. The camera 10 is disposed outside the robot 1 in order to capture an image of the mark MK.

As the mark MK, any form of mark may be used as long as it is possible to detachably fix the mark on the surface of the tool 9, etc. and as long as it is possible to simply identify the position of the mark (e.g., the position of the center of gravity thereof) by processing an image thereof acquired by the camera 10. In this embodiment, the mark MK is constituted of a disk-shaped magnet that faces the camera 10 and that can be simply attached to and detached from the surface of the metallic tool 9.

Figure 2:
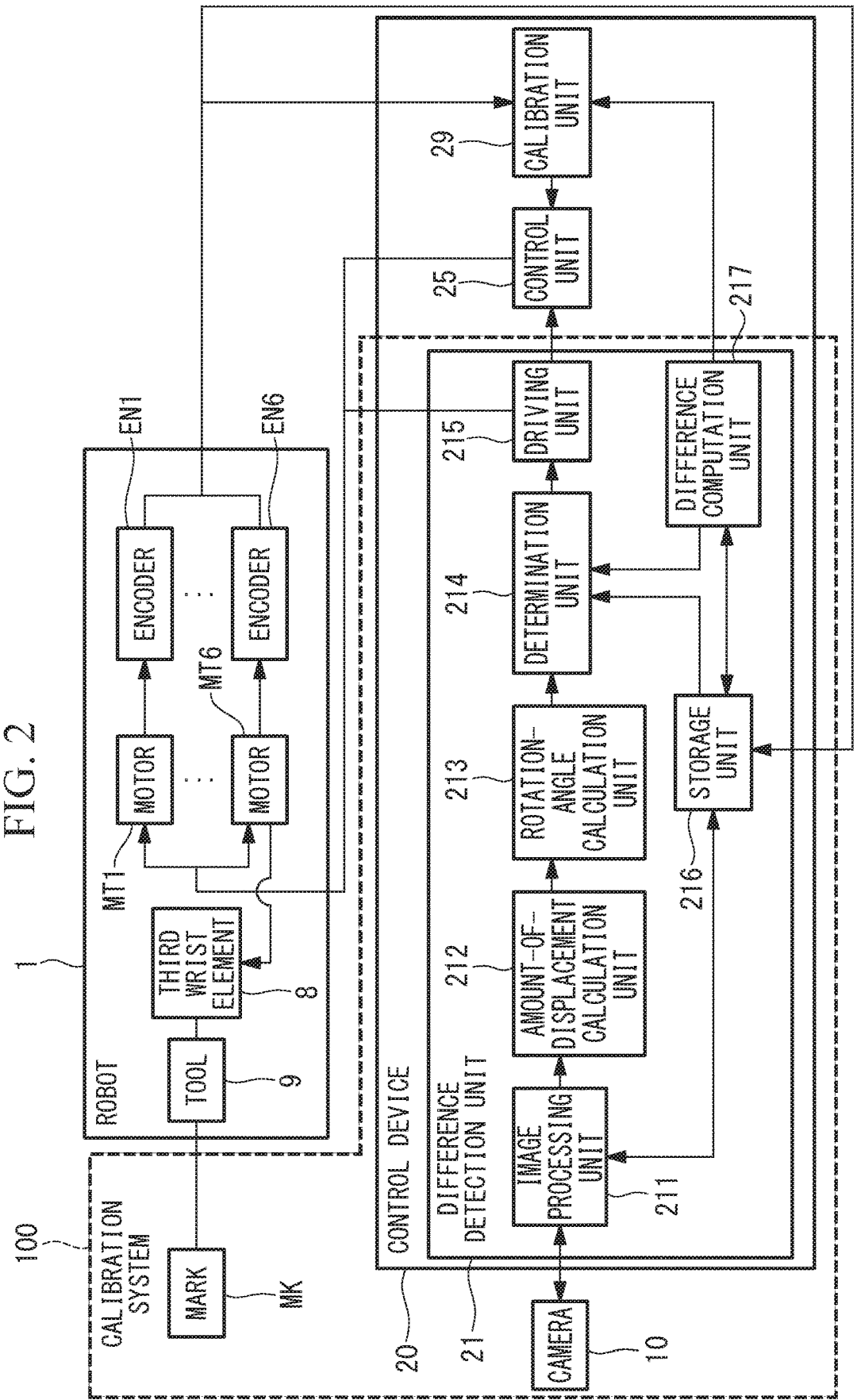
FIG. 2 is a block diagram of the calibration system and a part of the robot.

The control device 20 is constituted of a CPU (Central Processing Unit), a ROM (Read Only Memory), a RAM (Random Access Memory), and a memory that are not shown in FIG. 2. The CPU loads programs stored in the ROM into the RAM and the memory, whereby the control device 20 executes the functions of the individual programs.

The control device 20 is configured to function as a control unit 25, a difference detection unit 21, and a calibration unit 29. The control unit 25 is configured to control the rotation angles of the motors MT1 to MT6 on the basis of signals fed from the difference detection unit 21 and the calibration unit 29, which will be described later. Furthermore, the control unit 25 receives, via the calibration unit 29, numerical information representing the rotation angles of the motors MT1 to MT6 (hereinafter also referred to as rotation-angle signals), which is output from the individual encoders EN1 to EN6, and accordingly executes feedback control for the motors MT1 to MT6.

For this purpose, the rotation angles that are input to the motors MT1 to MT6 and the rotation-angle signals that are output from the encoders EN1 to EN6 are arranged to have correspondence relationships. Regarding these correspondence relationships, when the motors MT1 to MT6 or reduction gears of the joint shafts J1 to J6 are reinstalled or are replaced, there are cases where the rotation-angle signals that are output from the encoders EN1 to EN6 become deviated in relation to the rotation angles that are input to the motors MT1 to MT6 compared with those before the reinstallation or replacement.

The difference detection unit 21 is configured to calculate differences representing such deviations. The processing executed by the difference detection unit 21 will be described later in detail. The calibration unit 29 performs calibration according to the differences detected by the difference detection unit 21, which makes it possible to utilize the correspondence relationships that were set before reinstallation or replacement even after the motors MT1 to MT6 or reduction gears are reinstalled or replaced.

As shown in FIG. 2, the difference detection unit 21 includes an image processing unit 211, an amount-of-displacement calculation unit 212, a rotation-angle calculation unit 213, a determination unit 214, a driving unit 215, a storage unit 216, and a difference computation unit 217. The image processing unit 211 is configured to process an image acquired by the camera 10 and identify the position of the mark MK in the image and to store the rotation-angle signal output from the encoder EN2 at the time of the image acquisition and the identified position of the mark MK in a mutually corresponding fashion in the storage unit 216.

In this embodiment, as a specific method of identifying the position of the mark MK, the position of the center of gravity of the mark MK is identified in the form of two-dimensional coordinate values in the image.

The amount-of-displacement calculation unit 212 is configured to calculate, by using such two-dimensional coordinate values, an amount of displacement representing the difference in the position of the mark MK between two images acquired at different timings.

The rotation-angle calculation unit 213 is configured to calculate, by using the ratio of a predetermined angle (e.g., +0.1°) to the amount of displacement calculated by the amount-of-displacement calculation unit 212 when the motor MT2 of the joint shaft J2 is rotated by that predetermined angle, a rotation angle of the motor MT2 of the joint shaft J2 with which the amount of displacement calculated by the amount-of-displacement calculation unit 212 becomes zero, i.e., with which the positions of the mark MK in the two images acquired at different timings substantially match each other.

The storage unit 216 stores information representing correspondence relationships between the positions of the mark MK, identified from images acquired by the camera 10 at a plurality of timings as described above, and the rotation-angle signals from the encoder EN2, and also stores a preset threshold ε. The determination unit (difference calculation unit) 214 is configured to determine whether or not the absolute value of the rotation angle calculated by the rotation-angle calculation unit 213 is less than the threshold c stored in the storage unit 216. The driving unit 215 is configured to rotate the motor MT2 by the rotation angle calculated by the rotation-angle calculation unit 213 in the case where it is determined that the absolute value of that rotation angle is greater than or equal to the threshold ε.

The difference computation unit (difference calculation unit) 217 is configured to calculate, as a calibration value, the difference between the rotation-angle signal then being output from the encoder EN2 and the rotation-angle signal stored in the storage unit 216 in the case where it is determined that the absolute value of the rotation angle calculated by the rotation-angle calculation unit 213 is less than the threshold ε. A method of calculating the difference serving as a calibration value will be described later in detail.

The calibration unit 29 is configured to execute calibration in which the difference calculated by the difference computation unit 217 is added to (or subtracted from) the rotation-angle signal detected after reinstallation or replacement of the motor or reduction gear.

Figure 3:
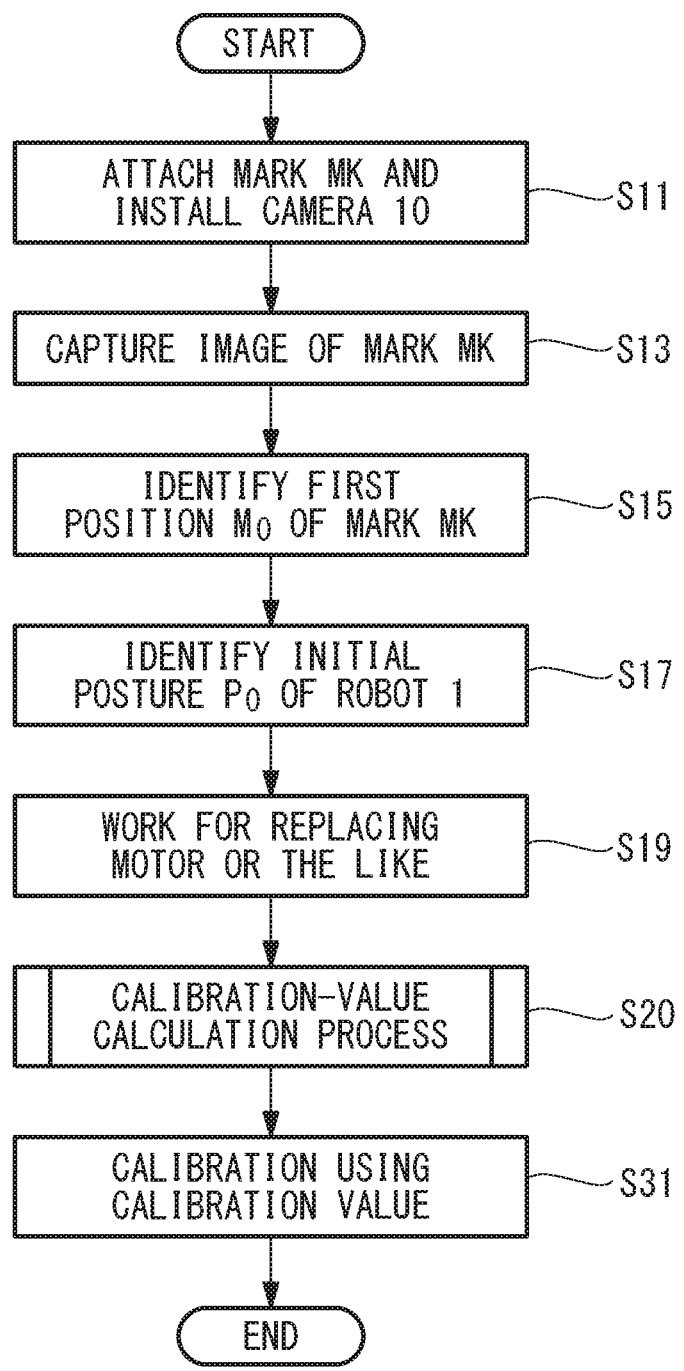
FIG. 3 is a flowchart of a calibration method.

A calibration method using the thus-configured calibration system 100 according to this embodiment will be described below with reference to a flowchart in FIG. 3.

In the calibration method according to this embodiment, first, before replacing the motor MT2 or reduction gear of the joint shaft J2, which is to be replaced, the mark MK is attached to a side face of the tool 9, and the camera 10 that captures an image of the mark MK is installed outside the robot 1 by using the tripod 12 (step S11). In order to capture an image of the circular mark MK with the camera 10 as a true circle without causing distortion, the camera 10 should preferably be installed such that the camera 10 and the mark MK squarely face each other.

That is, the camera should preferably be installed such that the joint shaft J2 corresponding to the motor MT2 or reduction gear to be replaced and the optical axis of the camera 10 become parallel to each other. In the case where distortion is taken into consideration when performing image processing, the joint shaft J2 corresponding to the motor MT2 to be replaced and the optical axis of the camera 10 need not necessarily be parallel to each other, and it suffices that the mark MK be included in the image-capturing range of the camera 10.

Then, an image of the range including the mark MK is captured by the camera 10, whereby an image including the mark MK is acquired (step S13). The acquired image is subjected to image processing by the image processing unit 211, whereby the center of gravity of an image of the mark MK in the acquired image is identified as a first position $M_0$ (step S15).

Figure 4:
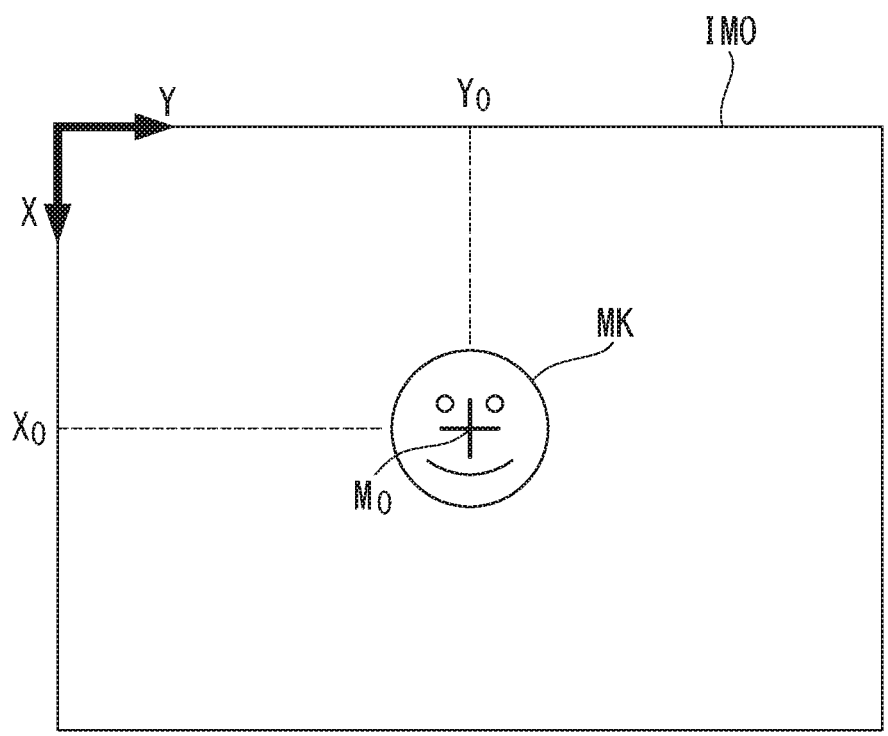
FIG. 4 is a schematic illustration of an image acquired by a camera.

FIG. 4 is a schematic illustration of an image IM0 acquired by the camera 10. In order to identify the position of the center of gravity of the mark MK in the image IM0, the image processing unit 211 sets an X axis and a Y axis, as shown in FIG. 4. Specifically, considering the top left vertex of the acquired rectangular image IM0 as the origin, the image processing unit 211 sets the vertically downward direction as the positive direction along the X axis and the rightward direction perpendicular to the X axis as the positive direction along the Y axis.

An image of the mark MK is stored in advance in the storage unit 216, and the image processing unit 211 detects the image of the mark MK in the image IM0 by pattern matching to identify the position of the center of gravity of the mark MK. The image processing unit 211 stores the identified position of the center of gravity of the mark MK in the storage unit 216 as a first position $M_0=(X_0, Y_0)$.

Then, the posture of the robot 1 at the timing of acquisition of the image IM0 is stored in the storage unit 216 as an initial posture $P_0$ (step S17). The initial posture $P_0$ includes the rotation-angle signals output from the encoders EN1 to EN6 for the motors MT1 to MT6 in the individual joint shafts J1 to J6 of the robot 1. In the case of the robot 1 in this embodiment, the initial posture $P_0$ is represented as a vector having six components in the form $P_0=(\theta_1, \theta_2, \theta_3, \theta_4, \theta_5, \Theta_6)$. The first position $M_0$ at the timing of acquisition of the image IM0 and the initial posture $P_0$ of the robot 1 are stored in the storage unit 216 in a mutually corresponding fashion.

Then, in this embodiment, work for replacing the motor MT2 of the joint shaft J2 of the robot 1 is executed (step S19). Note that, although the motor MT2 of the joint shaft J2 is replaced as a part that affects the relationship between the rotation angle of a motor and the rotation-angle signal output from an encoder in this embodiment, in other embodiments, for example, the motor of another joint shaft may be replaced, or the reduction gear of a motor may be reinstalled.

Figure 5:
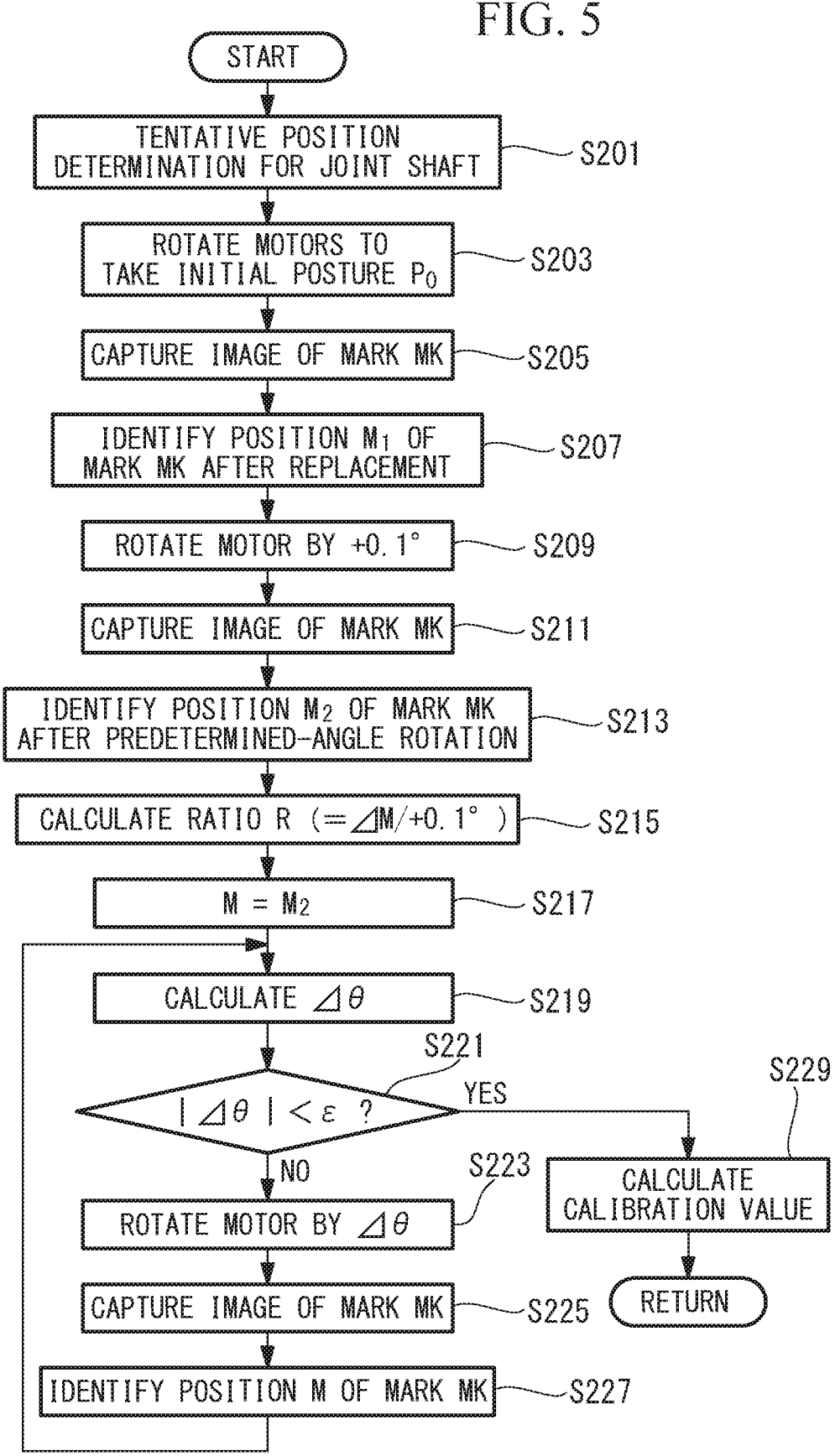
FIG. 5 is a flowchart of a calibration-value calculation process.

After the work for replacing a motor or the like is executed, the difference detection unit 21 executes a calibration-value calculation process (step S20). As shown in FIG. 5, in the calibration-value calculation process, first, tentative position determination for the joint shaft J2 including the replaced motor MT2 is executed (step S201). In the tentative position determination, the position of the joint shaft J2 is determined such that the mark MK falls within the image-capturing range of the camera 10. In order that the mark MK falls within the image-capturing range even if the motor MT2 is rotated by ±2°, the position of the joint shaft J2 should preferably be determined such that the absolute value of displacement of the joint shaft J2 before and after the replacement of the motor MT2 is not greater than 1°. Note that, even if the mark MK is not included in the image-capturing range at the time of the tentative position determination, the motor MT2 may be rotated, and tentative position determination may be newly executed at the timing when the mark MK has become included in the image-capturing range.

Then, by the operation of the driving unit 215, the motors MT1 to MT6 of the individual joint shafts J1 to J6 are rotated so that the posture of the robot 1 becomes the initial posture $P_0$ stored in the storage unit 216 in step S15 of the calibration process (step S203). The camera 10 captures an image of the mark MK after the rotation (step S205), and the image processing unit 211 identifies the position of the gravity center of the mark MK in the acquired image as a position $M_1$ after replacement and stores the position $M_1$ after replacement in the storage unit 216 (step S207).

Figure 6:
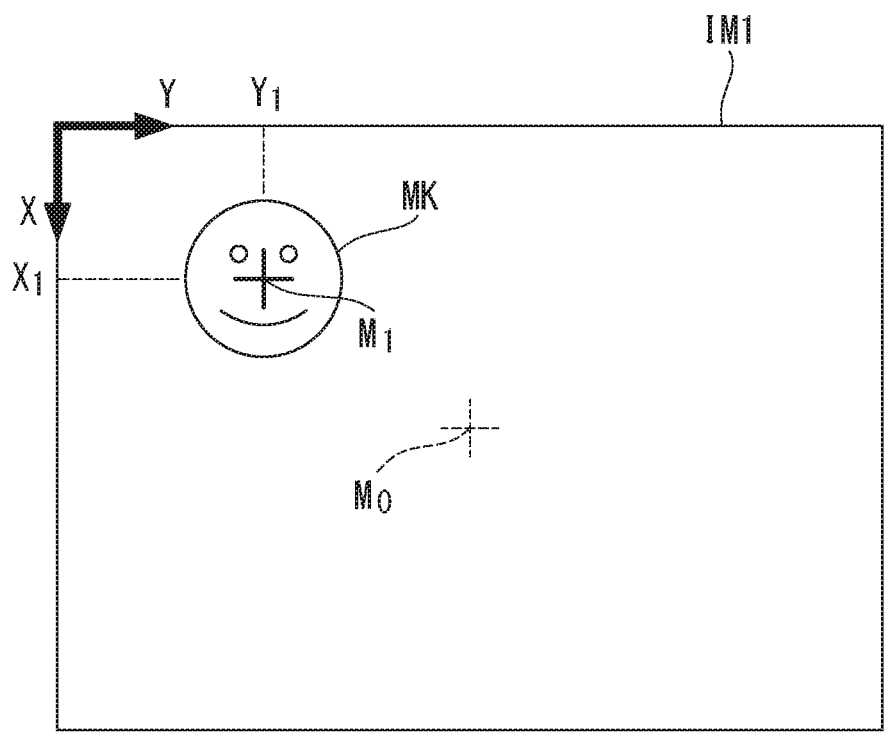
FIG. 6 is a schematic illustration of an image acquired by the camera after replacement of a motor.

FIG. 6 is a schematic illustration of an image IM1 acquired by the camera 10 after the replacement of the motor MT2. As shown in FIG. 6, when the motor MT2 of the joint shaft J2 is replaced, an error occurs in the orientation of the joint shaft J2 before and after the replacement, and thus the position $M_1$ after replacement becomes displaced from the first position $M_0$.

After the position M1 after replacement is stored, the difference computation unit 217 causes the driving unit 215 to operate so as to rotate the replaced motor MT2 of the joint shaft J2 in the positive direction (clockwise in this embodiment) by 0.1° (step S209 in FIG. 5). The camera 10 captures an image of the mark MK after the rotation (step S211), and the image processing unit 211 identifies the position of the gravity center of the mark MK in the image as a position M2 after predetermined-angle rotation and stores the position M2 after predetermined-angle rotation in the storage unit 216 (step S213). The amount-of-displacement calculation unit 212 calculates $\Delta M=M_2-M_1$, which represents the amount of displacement of the mark MK in the images from the position $M_1$ after replacement to the position M2 after predetermined-angle rotation, and the rotation-angle calculation unit 213 calculates a ratio R ($=\Delta M/+0.1°$) of the amount of displacement $\Delta M$ to the rotation angle of 0.1° (step S215).

Then, the identified position M2 after predetermined-angle rotation is substituted for a position M (step S217), and the rotation-angle calculation unit 213 calculates, by using the ratio R, a rotation angle $\Delta\theta$ by which the replaced motor MT2 of the joint shaft J2 is to be rotated so that the position M match the first position $M_0$ (step S219).

The determination unit 214 determines whether or not the absolute value of the calculated rotation angle $\Delta\theta$ is less than the threshold ε stored in advance in the storage unit 216 (step S221). In the case where the absolute value of the rotation angle $\Delta\theta$ is greater than or equal to the threshold ε (NO in step S221), the difference computation unit 217 causes the driving unit 215 to operate so as to rotate the replaced motor MT2 of the joint shaft J2 by the rotation angle $\Delta\theta$ (step S223). The camera 10 acquires a captured image including the mark MK after the rotation (step S225). The amount-of-displacement calculation unit 212 identifies the position M of the center of gravity of the mark MK in the acquired image (step S227). Then, the processing in and after step S219 is repeated.

In the case where it is determined in the processing in step S221 that the absolute value of the rotation angle $\Delta\theta$ is less than the threshold c (YES in step S221), the difference computation unit 217 calculates, as a calibration value, the difference obtained by subtracting the rotation-angle signal output from the encoder EN2 when the position of the mark MK is moved to the position M in this case from the rotation-angle signal output from the encoder EN2 when the position of the mark MK was the first position $M_0$ (step S229). Then, the difference detection unit 21 terminates the calibration-value calculation process.

After the calibration-value calculation process is terminated, the calibration value for calibrating the rotation-angle signal output from the encoder EN2 is set in the calibration unit 29 (step S31 in FIG. 3), and the calibration method is terminated.

As described above, with the calibration system 100 and the calibration method according to this embodiment, the difference between rotation-angle signals output from the encoder EN2 when images of the mark MK acquired before and after replacement of the motor MT2 of the joint shaft J2 are caused to substantially match each other is used as a calibration value. Accordingly, the correspondence relationship between the rotation angle input to the motor MT2 and the rotation-angle signal output from the encoder EN2 can be simply matched before and after replacement of the motor MT2.

In this case, it suffices that it is possible with the camera 10 to acquire an image of the mark MK fixed on the tool 9. This eliminates the need for providing the mark MK in advance at a specific position of the robot 1 including the tool 9, and thus there are fewer restrictions about the position of the mark MK and the position of the camera 10. Accordingly, an advantage is afforded in that it is possible to moderate manufacturing costs of the robot 1.

Although a method of calculating the difference between rotation-angle signals detected by the difference detection unit 21 has been described by way of an example in the context of this embodiment, various modifications are possible regarding calculation of the difference between rotation-angle signals. For example, in another embodiment, the difference that is calculated as a calibration value may be the difference between a rotation-angle signal output from an encoder at the timing when the absolute value of the distance between the position M of the mark MK after replacement of a motor or the like and the first position $M_0$ has become less than a preset threshold and a rotation-angle signal output from the encoder when the position of the mark MK was the first position $M_0$.

As a result, the following aspects can be introduced by the aforementioned embodiments.

The present invention, in one aspect thereof, provides a calibration system including: a mark for a robot including a first member and a second member that are connected to each other so as to allow relative movement via a joint shaft driven by a motor and also including a rotation-angle sensor that outputs a signal corresponding to a rotation angle of the motor, the mark being fixed to the second member; a camera that is disposed outside the robot and that acquires images of the mark; and a difference detection unit that detects the difference between signals output from the rotation-angle sensor at individual timings of acquisition of images in which the positions of the mark are caused to substantially match each other, the images being acquired by the camera before and after reinstallation or replacement of a part that affects a correspondence relationship between the amount of relative movement of the second member in relation to the first member and the signal output from the rotation-angle sensor.

According to this aspect, the mark is fixed to the second member of the robot, an image of the mark is acquired by using the camera disposed at a position at which the mark can be captured, and a signal output from the rotation-angle sensor at the timing of the acquisition is stored. Then, a part that affects a correspondence relationship between the amount of relative movement of the first member and the second member and the signal output from the rotation-angle sensor is reinstalled or replaced without changing the position of the mark on the second member or the position of the camera. Then, the first member and the second member are moved relative to each other such that the mark in the image is placed at a position substantially matching the position thereof before reinstallation or replacement of the part, and upon acquiring a signal then output from the rotation-angle sensor, the difference detection unit detects the difference from the signal stored before reinstallation or replacement of the part.

That is, since signals output from the rotation-angle sensor when the same mark is placed at the same position in images should be the same, an offset corresponding to the difference detected by the difference detection unit is applied to a signal output from the rotation-angle sensor. Accordingly, the correspondence relationship between the amount of relative movement of the first member and the second member and the signal output from the rotation-angle sensor can be simply matched before and after reinstallation or replacement of the part.

In this case, according to this aspect, it suffices to capture images of the mark fixed to the second member by using the camera. Thus, it is not necessary to provide the mark at a specific position of the second member in advance, and thus there are fewer restrictions about the position of the mark and the position of the camera. This serves to moderate the manufacturing costs of the robot.

In the above aspect, the calibration system may further include a calibration unit that performs calibration on the basis of the difference such that the correspondence relationship after reinstallation or replacement of the part matches the correspondence relationship before reinstallation or replacement of the part.

In this case, it is possible to use the correspondence relationship defined before reinstallation or replacement of the part instead of defining new correspondence relationship after reinstallation or replacement of the part.

In the above aspect, the difference detection unit may include: a storage unit that stores, in a mutually corresponding fashion, a first position of the mark in the image acquired by the camera before reinstallation or replacement of the part and a signal then output from the rotation-angle sensor; an amount-of-displacement calculation unit that calculates an amount of displacement of the mark in the image acquired by the camera when the motor is rotated by a predetermined angle after reinstallation or replacement of the part; a rotation-angle calculation unit that calculates, on the basis of the amount of displacement calculated by the amount-of-displacement calculation unit, a rotation angle of the motor for moving the mark in the image to the first position; a driving unit that rotationally drives the motor by the rotation angle calculated by the rotation-angle calculation unit; and a difference calculation unit that waits until the absolute value of the rotation angle calculated by the rotation-angle calculation unit converges within a predetermined threshold as a result of repetition of the calculation of the rotation angle by the rotation-angle calculation unit and the rotational driving of the motor by the driving unit and that calculates the difference between a signal output from the rotation-angle sensor at the timing of the convergence and the signal stored in the storage unit.

According to this aspect, before reinstallation or replacement of the part, the first position of the mark in the image acquired by the camera and the signal then output from the rotation-angle sensor are stored in the storage unit in a mutually corresponding fashion. Then, after reinstallation or replacement of the part, the amount-of-displacement calculation unit calculates the amount of displacement of the mark in the image acquired by the camera when the motor is rotated by the predetermined angle.

On the basis of the amount of displacement calculated by the amount-of-displacement calculation unit, the rotation-angle calculation unit calculates a rotation angle of the motor for adjusting the position of the mark in the image acquired by the camera after reinstallation or replacement of the part to the first position. Then, the motor is rotationally driven by the calculated rotation angle. The calculation of the rotation angle and the rotational driving of the motor by the calculated rotation angle, described above, are repeated until the absolute value of the calculated rotation angle converges within the predetermined threshold. Upon convergence of the rotation angle, the difference calculation unit calculates the difference between the signal then output from the rotation-angle sensor and the signal stored in the storage unit.

That is, when the motor is rotated by the predetermined angle after reinstallation or replacement of the part, a rotation angle of the motor, needed for adjusting the position of the mark in the image acquired after reinstallation or replacement of the part to the first position, is calculated with reference to the amount of displacement in the position of the mark. In practice, even if the motor is rotated by the rotation angle calculated in the first iteration, the position of the mark in the image acquired after reinstallation or replacement of the part rarely matches the first position. However, as the calculation of the rotation angle and the rotation of the motor by the calculated rotation angle are repeated, the position of the mark in the image acquired after reinstallation or replacement of the part gradually becomes closer to the first position. Here, by checking the difference of the position of the mark in the image acquire after reinstallation or replacement of the part from the first position against the threshold, it is possible to calculate an offset signal value used as a calibration value after reinstallation or replacement of the part.

In the above aspect, an optical axis of the camera may be parallel to the joint shaft.

In this case, the camera and the mark that is captured by the camera squarely face each other. This serves to reduce distortion of the mark in images acquired by the camera, thereby improving the accuracy of identifying the position of the mark.

The present invention, in another aspect thereof, provides a calibration method including: a step of fixing a mark for a robot including a first member and a second member that are connected to each other so as to allow relative movement via a joint shaft driven by a motor and also including a rotation-angle sensor that outputs a signal corresponding to a rotation angle of the motor, the mark being fixed to the second member; a step of acquiring images of the mark by using a camera disposed outside the robot; and a step of detecting the difference between signals output from the rotation-angle sensor at individual timings of acquisition of images in which the positions of the mark are caused to substantially match each other, the images being acquired before and after reinstallation or replacement of a part that affects a correspondence relationship between the amount of relative movement of the second member in relation to the first member and the signal output from the rotation-angle sensor.

According to the present invention, an advantage is afforded in that the correspondence relationship between the axial angle of a joint shaft and a signal output from a rotation-angle sensor can be simply matched before and after reinstallation or replacement of a motor, a reduction gear, or the like in a robot, while moderating manufacturing costs of the robot.

The invention claimed is:

1. A calibration system comprising:
   a mark for a robot including a first member and a second member that are connected to each other so as to allow relative movement via a joint shaft driven by a motor and also including a rotation-angle sensor that outputs a signal corresponding to a rotation angle of the motor, the mark being fixed to the second member;
   a camera that is disposed outside the robot and that acquires images of the mark; and
   a difference detection unit that detects the difference between signals output from the rotation-angle sensor at individual timings of acquisition of images in which the positions of the mark are caused to substantially match each other without changing the position of the camera, the images being acquired by the camera before and after reinstallation or replacement of a part that affects a correspondence relationship between the amount of relative movement of the second member in relation to the first member and the signal output from the rotation-angle sensor.

2. A calibration system according to claim 1, further comprising a calibration unit that performs calibration on the basis of the difference such that the correspondence relationship after reinstallation or replacement of the part matches the correspondence relationship before reinstallation or replacement of the part.

3. A calibration system according to claim 1, wherein the difference detection unit includes:
   a storage unit that stores, in a mutually corresponding fashion, a first position of the mark in the image acquired by the camera before reinstallation or replacement of the part and a signal then output from the rotation-angle sensor;
   an amount-of-displacement calculation unit that calculates an amount of displacement of the mark in the image acquired by the camera when the motor is rotated by a predetermined angle after reinstallation or replacement of the part;
   a rotation-angle calculation unit that calculates, on the basis of the amount of displacement calculated by the amount-of-displacement calculation unit, a rotation angle of the motor for moving the mark in the image to the first position;
   a driving unit that rotationally drives the motor by the rotation angle calculated by the rotation-angle calculation unit; and
   a difference calculation unit that waits until the absolute value of the rotation angle calculated by the rotation-angle calculation unit converges within a predetermined threshold as a result of repetition of the calculation of the rotation angle by the rotation-angle calculation unit and the rotational driving of the motor by the driving unit and that calculates the difference between a signal output from the rotation-angle sensor at the timing of the convergence and the signal stored in the storage unit.

4. A calibration system according to claim 1, wherein an optical axis of the camera is parallel to the joint shaft.

5. A calibration method comprising:
a step of fixing a mark for a robot including a first member and a second member that are connected to each other so as to allow relative movement via a joint shaft driven by a motor and also including a rotation-angle sensor that outputs a signal corresponding to a rotation angle of the motor, the mark being fixed to the second member;
a step of acquiring images of the mark by using a camera disposed outside the robot; and
a step of detecting the difference between signals output from the rotation-angle sensor at individual timings of acquisition of images in which the positions of the mark are caused to substantially match each other without changing the position of the camera, the images being acquired before and after reinstallation or replacement of a part that affects a correspondence relationship between the amount of relative movement of the second member in relation to the first member and the signal output from the rotation-angle sensor.

6. A calibration system comprising:
a camera that acquires images of the mark for a robot including a first member and a second member that are connected to each other so as to allow relative movement via a joint shaft driven by a motor and also including a rotation-angle sensor that outputs a signal corresponding to a rotation angle of the motor, the mark being fixed to the second member; and
a difference detection unit that detects the difference between signals output from the rotation-angle sensor at individual timings of acquisition of images in which the positions of the mark are caused to substantially match each other without changing the position of the camera, the images being acquired by the camera before and after reinstallation or replacement of a part that affects a correspondence relationship between the amount of relative movement of the second member in relation to the first member and the signal output from the rotation-angle sensor.

7. A calibration system comprising:
a step of acquiring images of the mark by using a camera for a robot including a first member and a second member that are connected to each other so as to allow relative movement via a joint shaft driven by a motor and also including a rotation-angle sensor that outputs a signal corresponding to a rotation angle of the motor, the mark being fixed to the second member; and
a step of detecting the difference between signals output from the rotation-angle sensor at individual timings of acquisition of images in which the positions of the mark are caused to substantially match each other without changing the position of the camera, the images being acquired by the camera before and after reinstallation or replacement of a part that affects a correspondence relationship between the amount of relative movement of the second member in relation to the first member and the signal output from the rotation-angle sensor.

* * * * *